(12) United States Patent
Fleischmann

(10) Patent No.: US 6,217,757 B1
(45) Date of Patent: Apr. 17, 2001

(54) STORM DRAIN FILTER WITH VERTICAL SCREENS

(76) Inventor: Charles R. Fleischmann, 164 Danefield Pl., Moraga, CA (US) 94556

( * ) Notice: Subject to any disclaimer, the term of this patent is extended or adjusted under 35 U.S.C. 154(b) by 0 days.

(21) Appl. No.: 09/558,503

(22) Filed: Apr. 26, 2000

(51) Int. Cl.[7] .............................. B01D 24/08; B01D 35/02
(52) U.S. Cl. ........................ 210/163; 210/166; 210/265; 210/282; 210/299; 404/4
(58) Field of Search ..................................... 210/163, 164, 210/166, 265, 282, 283, 299, 266; 404/4, 5

(56) References Cited

U.S. PATENT DOCUMENTS

| | | | |
|---|---|---|---|
| 528,888 | * 11/1894 | McGill | 210/166 |
| 783,556 | * 2/1905 | Van Buskirk | 210/163 |
| 1,862,134 | * 6/1932 | Boosey | 210/163 |
| 2,283,365 | * 5/1942 | Heinkel | 210/166 |
| 3,289,847 | * 12/1966 | Rothemund | 210/282 |
| 3,487,940 | * 1/1970 | Morris | 210/282 |
| 4,107,929 | * 8/1978 | Ebeling et al. | 210/163 |
| 5,284,580 | * 2/1994 | Shyh | 210/163 |
| 5,480,254 | 1/1996 | Autry et al. . | |
| 5,632,889 | 5/1997 | Tharp . | |
| 5,720,574 | 2/1998 | Barella . | |
| 5,744,048 | * 4/1998 | Stetler | 210/164 |
| 5,925,242 | * 7/1999 | McGhee | 210/164 |
| 5,958,226 | 9/1999 | Fleischmann . | |
| 6,083,402 | * 7/2000 | Butler | 210/282 |

FOREIGN PATENT DOCUMENTS

3001833 * 7/1981 (DE) .

* cited by examiner

Primary Examiner—Christopher Upton
(74) Attorney, Agent, or Firm—Jack Lo

(57) ABSTRACT

The present storm drain filter comprises a tubular housing with a solid vertical surrounding wall and sized for being recessed inside a storm drain. The housing is supported in the drain by a flange around its top edge. A tubular cartridge is detachably attached to a solid annular bottom plate of the housing. The cartridge comprises a solid annular top cover coaxial with a solid annular bottom closure; vertical tubular inner, intermediate, and outer screens concentrically connected between the top cover and bottom closure; and filter media enclosed between the screens. A central overflow opening inside the inner screen is aligned with a hole on the bottom plate of the housing. An annular debris trough is defined between the cartridge and the housing. Debris flowing into the filter is collected in the trough. As the level of debris rises and obstructs the lower part of the outer screen, the unobstructed upper part of the outer screen continues to filter the water. The vertical outer screen is tall enough to provide a large area which will take a long time to obstruct. When the screens or media are completely clogged, water will continue to flow by passing through the central overflow opening. A handle on the cartridge is used to lift or lower the entire filter in the drain. The top cover on the cartridge is removable for changing the media.

15 Claims, 4 Drawing Sheets

STORM DRAIN FILTER WITH VERTICAL SCREENS

BACKGROUND OF THE INVENTION

1. Field of the Invention

This invention relates generally to filters for filtering debris, hydrocarbons, and other contaminants from water flowing into storm drains.

2. Prior Art

Storm drains are provided in streets, parking lots, gas stations, and highways for draining water runoff. Some storm drains are provided with internal filters for preventing debris, hydrocarbons, and other contaminants from entering waterways.

My prior U.S. Pat. No. 5,958,226 discloses a storm drain filter sized to be positioned inside a storm drain. It includes a top debris tray detachably positioned within a bottom media tray. Each tray includes a peripheral trough surrounding a central overflow opening. The top tray is shorter in height than the bottom tray, so that a filter media receiving chamber is defined between the top tray and the bottom tray. Filter medium is positioned in the filter medium receiving chamber. In a first embodiment, the bottom surfaces of the top and bottom trays are perforated. In a second embodiment, the bottom of the top tray and the inner wall of the bottom tray are perforated. In either embodiment, water flowing into the filter is distributed around the top trough, passed through the perforated surface of the top tray, the filter medium, the perforated surface of the bottom tray, and into the storm drain. Hydrocarbons and other contaminants are filtered by the filter medium. Large particles and debris are collected in the trough of the top tray. The filter may be cleaned by lifting out the top tray, shaking out the debris, and replacing it in the bottom tray. However, the perforated surface of the top tray is relatively small, so that it may quickly clog when a large amount of debris flows into the filter. The top tray can be removed by pulling on a handle attached thereto, but the bottom tray cannot be lifted with the handle.

U.S. Pat. No. 5,720,574 to Barella discloses a filter for being positioned inside a storm drain. It includes a peripheral trough surrounding a central overflow opening. A set of cartridges containing filter medium are positioned in the trough. Water flowing into the drain is distributed around the trough, and passes through the cartridges before exiting through a screen on the bottom of the trough. When water flow is high, excess water overflows through the central opening without passing through the cartridges. However, gravel, leaves, and other debris accumulate on top of the cartridges and block water flow, so that a worker must reach in and dig them out by hand, which is slow and time consuming. The horizontal screen has a relatively small surface area which may quickly clog when the inflow of debris is high. There is no handle for lifting the filter from the drain. U.S. Pat. No. 5,632,889 to Tharp discloses a similar filter.

U.S. Pat. No. 5,480,254 to Autry et al. discloses a storm drain filter that comprises a box with porous vertical walls and an opening on the bottom. It is wider than a storm drain for being positioned on top of and across it; it cannot be installed inside the storm drain. Storm water is filtered by the porous vertical walls as it flows through the filter and into the drain. The filter element of crushed stone is housed in a single chamber, but is too coarse to filter out anything but the largest pieces of debris. The filter element cannot be removed for cleaning or replacement.

OBJECTS OF THE INVENTION

Accordingly, objects of the present invention are:

to filter out debris, hydrocarbons, and other contaminants from water runoff flowing into a storm drain;

to continue unimpeded filtering even after collecting a large amount of debris;

to prolong filtering time;

to be impossible to clog;

to be easily lowered into or lifted from a storm drain as a single unit;

to have a filter cartridge which is easily replaced;

to provide different filter media for more effectively filtering different types of pollutants;

to be usable at building construction sites for filtering large particles without becoming clogged; and to be usable after building construction for filtering small particles and pollutants.

Further objects of the present invention will become apparent from a consideration of the drawings and ensuing description.

BRIEF SUMMARY OF THE INVENTION

The present storm drain filter comprises a tubular housing with a solid vertical surrounding wall and sized for being recessed inside a storm drain. The housing is supported in the drain by a flange around its top edge. A tubular cartridge is detachably attached to a solid annular bottom plate of the housing. The cartridge comprises a solid annular top cover coaxial with a solid annular bottom closure; vertical tubular inner, intermediate, and outer screens concentrically connected between the top cover and bottom closure; and filter media enclosed between the screens. A central overflow opening inside the inner screen is aligned with a hole on the bottom plate of the housing. An annular debris trough is defined between the cartridge and the housing. Debris flowing into the filter is collected in the trough. As the level of debris rises and obstructs the lower part of the outer screen, the unobstructed upper part of the outer screen continues to filter the water. The vertical outer screen is tall enough to provide a large area which will take a long time to obstruct. When the screens or media are completely clogged, water will continue to flow by passing through the central overflow opening. A handle on the cartridge is used to lift or lower the entire filter in the drain. The top cover on the cartridge is removable for changing the media.

Figure 1:
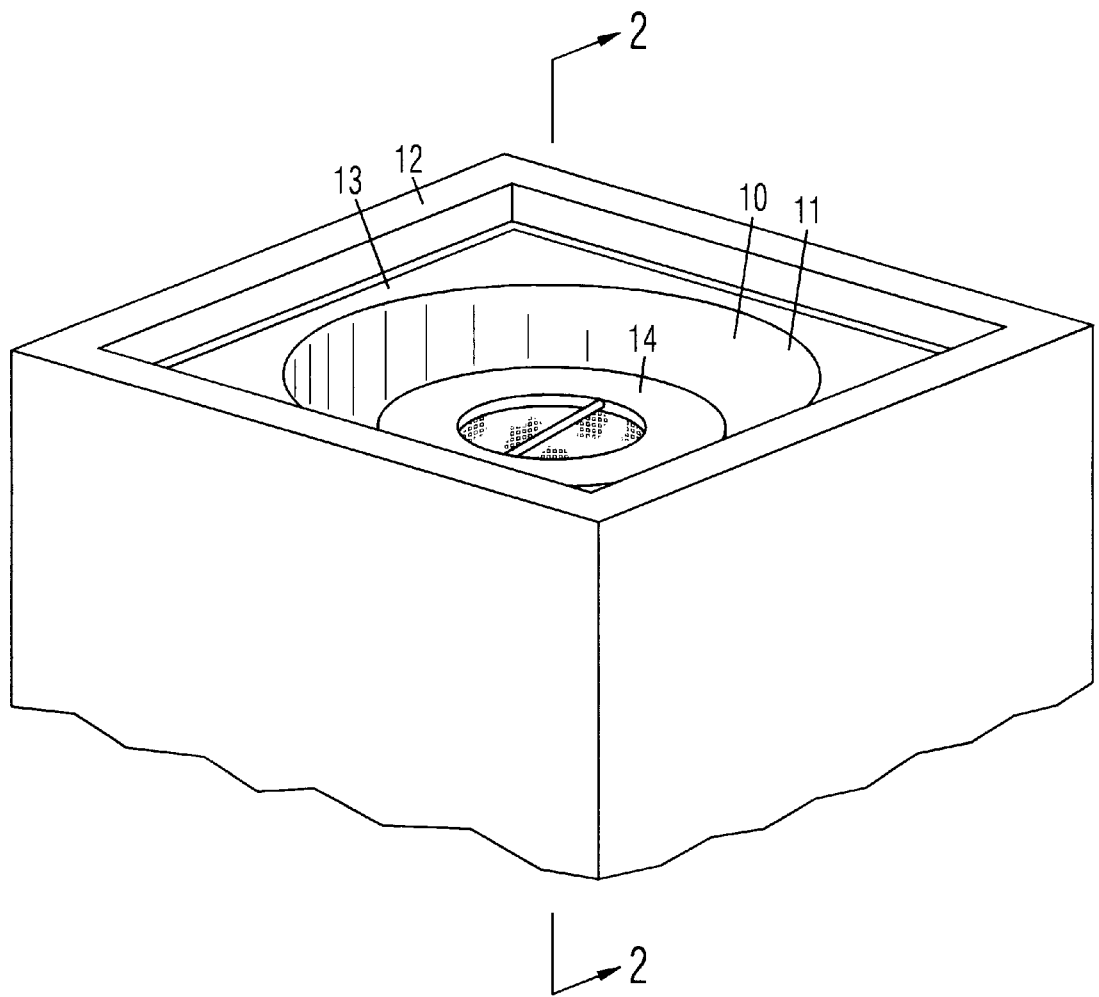
FIG. 1 is a top perspective view of the present storm drain filter in a storm drain.

| | |
|---|---|
| 10. Housing | 11. Wall |
| 12. Drain | 13. Flange |
| 14. Cartridge | 15. Bottom Plate |
| 16. Top Cover | 17. Bottom Closure |
| 18. Inner Screen | 19. Intermediate Screen |
| 20. Outer Screen | 21. First Filter Medium |
| 22. Second Filter Medium | 23. Central Overflow Opening |
| 24. Hole | 25. Debris Trough |
| 27. Debris | 28. Handle |
| 29. Connector | |

DETAILED DESCRIPTION OF THE INVENTION

FIG. 1

The present storm drain filter comprises a tubular housing 10 with a solid, generally vertical surrounding wall 11. Housing 10 is sized for being recessed inside a conventional storm drain 12. Although housing 10 is cylindrical in this example, it may be polygonal, such as square, and it may also be linear for filtering incoming water from only one side instead of all sides. Housing 10 is preferably supported on a shoulder of drain 12 by a flange 13 around the top edge of wall 11. A tubular filter cartridge 14 is securely but detachably attached to a solid annular bottom plate (not shown) of housing 10. A grate that normally covers storm drain 12 is not shown.

FIG. 2

Figure 2:
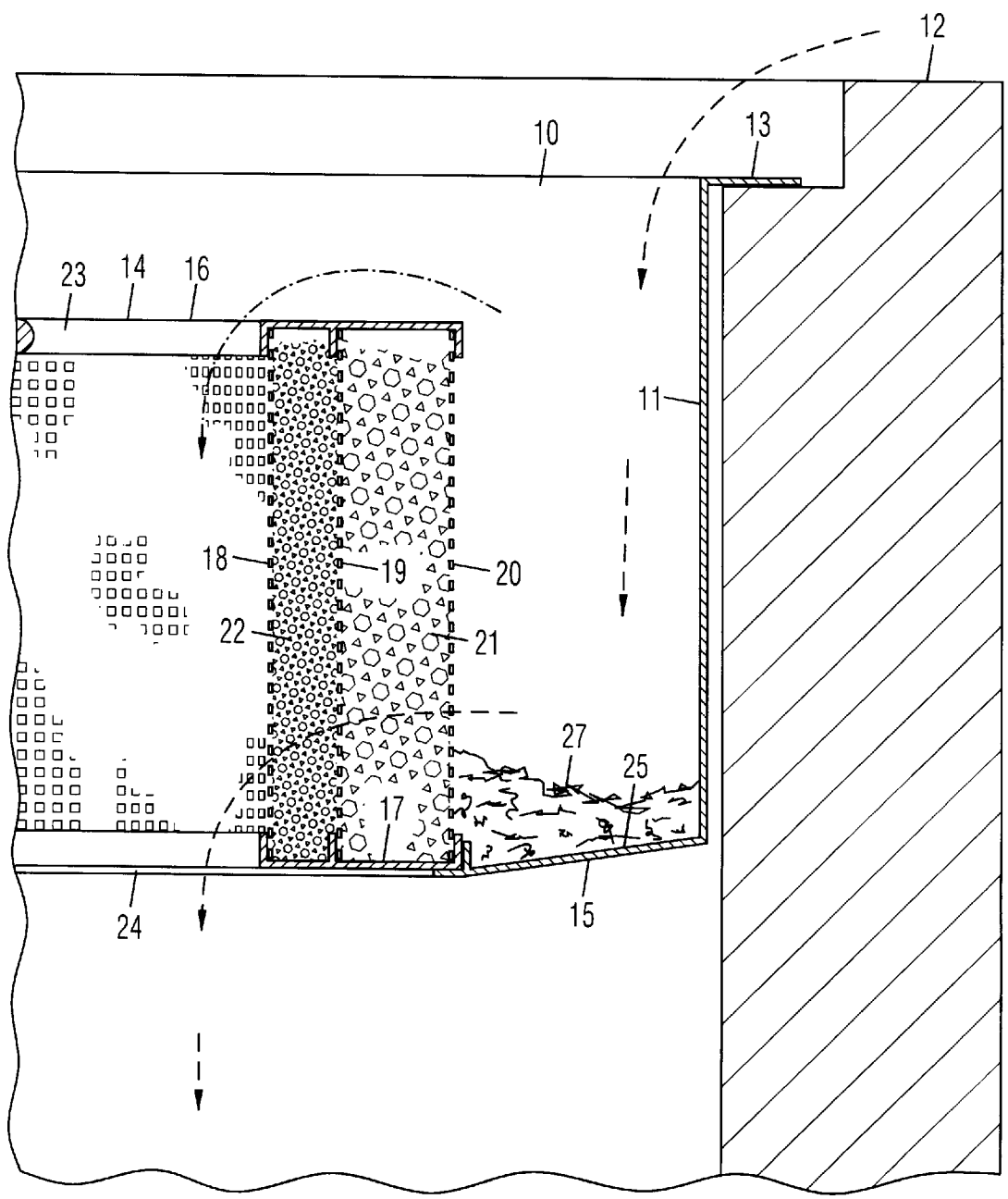
FIG. 2 is a side sectional view thereof taken along line 2—2 in FIG. 1.
Figure 3:
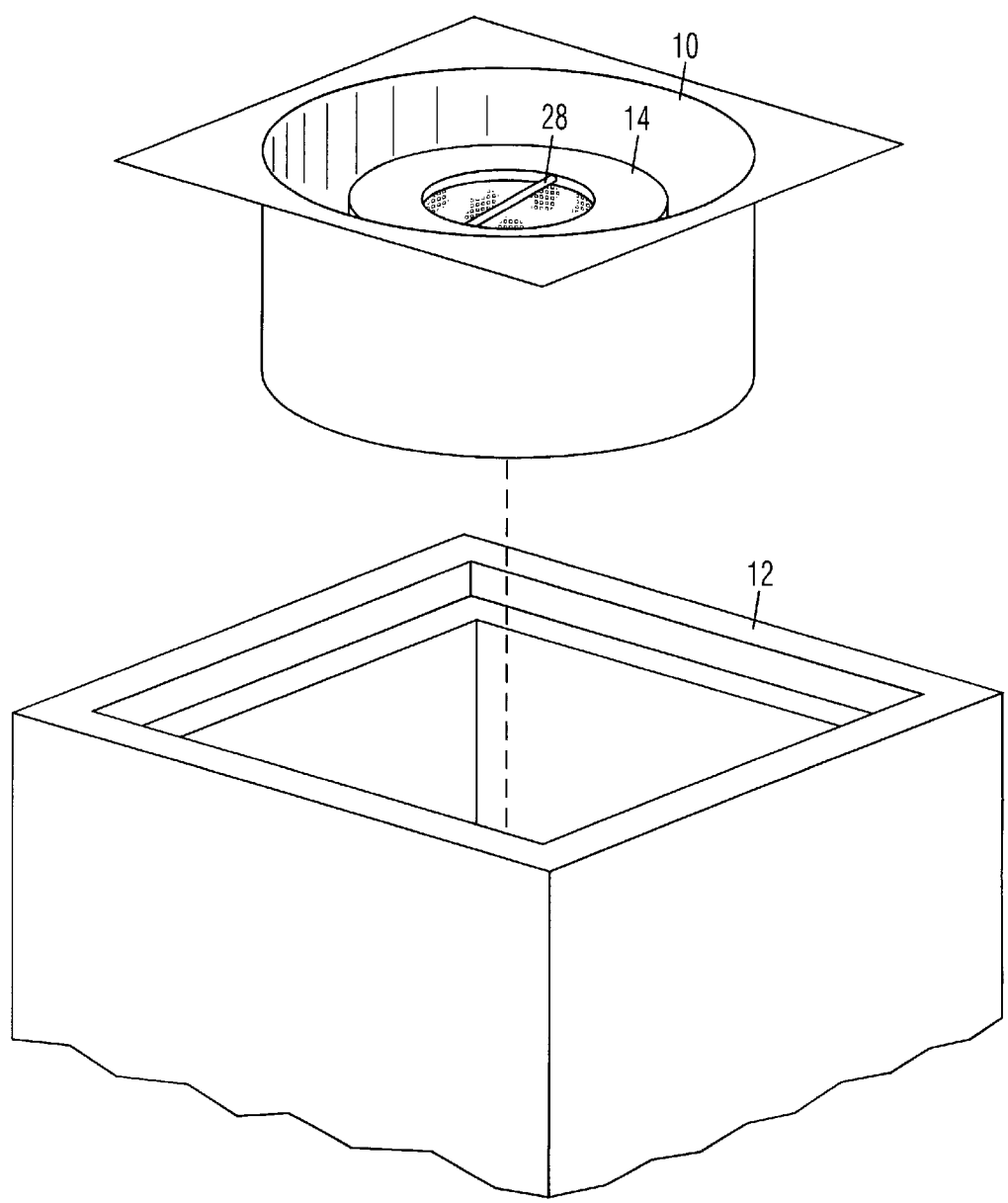
FIG. 3 is a top perspective view thereof being lifted from the storm drain.
Figure 4:
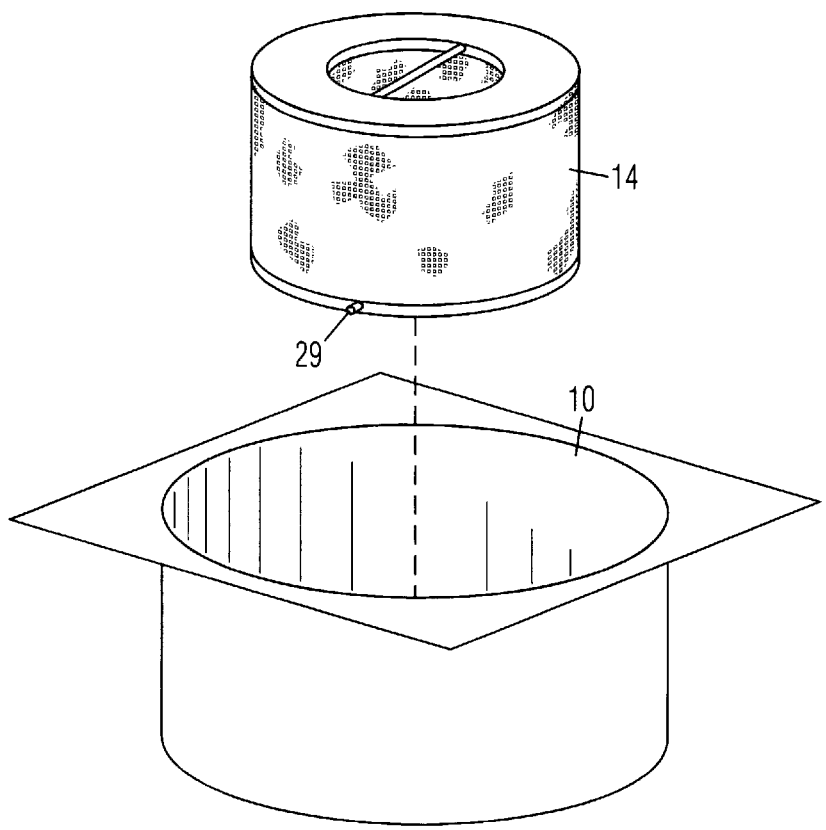
FIG. 4 is a top perspective view thereof when a cartridge is being removed from a housing.
Figure 5:
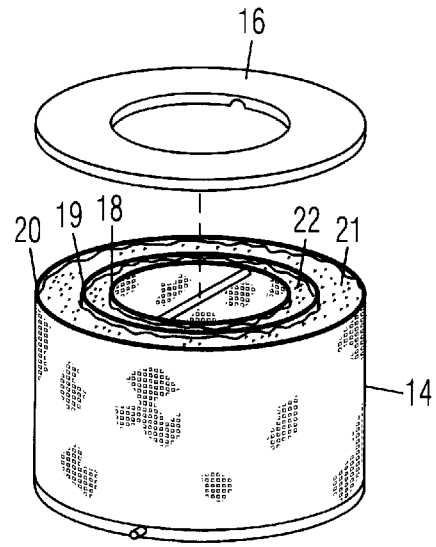
FIG. 5 is a top perspective view of the cartridge when a top end plate is being removed.

The filter is shown in a sectional view in FIG. 2. Cartridge 14 is supported on solid annular bottom plate 15 of housing 10. Bottom plate 15 is preferably sloped downwardly toward a center of the filter to help drain water. Cartridge 14 comprises a solid annular top cover 16 positioned above a solid annular bottom closure 17. Alternatively, bottom closure 17 may be integral with bottom plate 15. A vertical tubular inner screen 18, a vertical tubular intermediate screen 19, and a vertical tubular outer screen 20 are concentrically connected between top cover 16 and bottom end closure 17. Although screens 18–20 are cylindrical in this example, they may be polygonal or planar. Annular bottom plate 15 and annular top cover 16 may be also polygonal or linear instead of circular. Screens 18–20 may be any type of perforated sheets. Intermediate screen 19 may be eliminated if only one type of filter medium is desired.

A first filter medium 21 is held between intermediate screen 19 and outer screen 20, and a second filter medium 22 is held between inner screen 18 and intermediate screen 19. Filter medium 21 is preferably perlite—a natural volcanic glass—and filter medium 22 is preferably an activated charcoal, but they may be any other suitable types of media specifically selected for filtering expected pollutants. A central overflow opening 23 inside inner screen 18 of cartridge 10 is aligned with a hole 24 in bottom plate 15 of housing 10. An annular debris trough 25 is defined between outer screen 20 of cartridge 14 and surrounding wall 11 of housing 10. If housing 10 is in a linear shape for filtering water entering only from one side, there would be no central overflow opening. The filter may be used without filter media 21 and 22 at construction sites for catching larger pieces of debris. Eliminating the filter media prevents clogging when the inflow of debris is high during the construction period.

Larger debris 27 flowing into the filter is blocked by outer screen 20 and collected in debris trough 25. Bottom plate 15 of housing 10 is sloped downwardly toward a center thereof to facilitate drainage. Alternatively, bottom plate 15 may be sloped more or less than shown, or it may be horizontal. The water passing through media 21–22 is further cleansed of smaller debris, hydrocarbons, and other contaminants. As the level of debris 27 rises and obstructs the lower part of outer screen 20, the unobstructed upper part of outer screen 20 continues to filter the water, which is represented by the dashed arrows. Outer screen 20 is tall enough to provide a very large area which will take a relatively long time to fully obstruct. Housing 10 and cartridge 14 can be extended in length downward to provide an even greater surface area on outer screen 20 and thus an even longer filtering time. When inner outer screen 20 or filter media 21–22 are completely clogged, water will continue to drain by passing through central overflow opening 23.

FIG. 3

Since cartridge 14 is securely attached to housing 10, a handle 28 attached to cartridge 14 enables the entire filter to be lifted from drain 12. The filter is thus very easy to install and remove.

FIG. 4

Cartridge 14 is detachable from housing 10 by releasing connectors 29 from the bottom plate of housing 10. Connectors 29 may be any suitable type of releasable connectors, such as latches, pins riding in L-shaped slots, threads, etc. Alternatively, cartridge 14 may be permanently attached to housing 10.

FIG. 5

Top cover 16 on cartridge 14 is removable from screens 18–20 for replacing filter media 21–22.

SUMMARY AND SCOPE

Accordingly, the present storm drain filters out debris, hydrocarbons, and other contaminants from water runoff flowing into a storm drain. It continues unimpeded filtering even after collecting a large amount of debris. It is impossible to clog. It is easily lowered into or lifted from a storm drain in its entirety. It has a filter cartridge which is easily replaced. It provides different filter media for more effectively filtering different types of pollutants. It is usable at building construction sites for filtering larger particles without becoming clogged. It is also usable after building construction for filtering smaller particles and pollutants.

Although the above description is specific, it should not be considered as a limitation on the scope of the invention, but only as an example of the preferred embodiment. Many substitutes and variations are possible within the teachings of the invention. For example, different attachment methods, fasteners, materials, dimensions, etc. can be used unless specifically indicated otherwise. The relative positions of the elements can vary, and the shapes of the elements can vary. Therefore, the scope of the invention should be determined by the appended claims and their legal equivalents, not by the examples given.

I claim:

1. A storm drain filter, comprising:

a vertical wall adapted to be supported within a storm drain;

a bottom plate having a central opening connected to a side of said vertical wall;

a generally vertical inner screen extending up from said bottom plate; and a generally vertical outer screen extending up from said bottom plate, wherein said outer screen is positioned between said inner screen and said vertical wall;

wherein said inner screen and said outer screen are adapted to hold one or more filter media there between; and a debris trough defined between said vertical wall and said outer screen for collecting debris flowing into said filter;

whereby when a lower part of said outer screen is obstructed by a rising level of said debris, an unobstructed upper part of said outer screen is adapted to continue to filter fluid.

2. The storm drain filter of claim 1, wherein said bottom plate is slanted downwardly from said vertical wall toward said inner screen for facilitating drainage.

3. The storm drain filter of claim 1, further including a top cover attached across said inner screen and said outer screen.

4. The storm drain filter of claim 1, further including a flange on an opposite side of said vertical wall adapted to engage a shoulder of said storm drain.

5. The storm drain filter of claim 1, further including a vertical intermediate screen between said inner screen and said outer screen, wherein said outer screen and said intermediate screen are adapted to hold a first filter medium there between for filtering a first contaminant, and said inner screen and said intermediate screen are adapted to hold a second filter medium there between for filtering a second contaminant.

6. A storm drain filter, comprising:
a tubular housing with a solid surrounding wall and a solid annular bottom plate attached inside said surrounding wall, wherein said housing is adapted to be recessed inside a storm drain;
a tubular filter cartridge positioned within said surrounding wall and attached to said bottom plate of said housing, said cartridge comprising:
a solid annular top cover positioned above a solid annular bottom closure;
a generally vertical tubular outer screen extending between said top cover and said bottom closure;
a generally vertical tubular inner screen positioned within said outer screen and extending between said top cover and said bottom closure;
wherein said outer screen and said inner screen are adapted to receive one or more filter media there between; and
a central overflow opening arranged inside said inner screen of said cartridge and aligned with a hole within said bottom plate of said housing; and
an annular debris trough defined between said outer screen of said filter cartridge and said surrounding wall of said housing;
whereby said outer screen is adapted to block larger debris flowing into said filter;
said debris trough is adapted to collect said larger debris; and
said filter media is adapted to block smaller debris and contaminants; so that
when a lower part of said outer screen is obstructed by a rising level of said larger debris, an unobstructed upper part of said outer screen is adapted to continue to filter fluid; and
when said outer screen is clogged, said central overflow opening is adapted to continue to drain said fluid.

7. The storm drain filter of claim 6, wherein said bottom plate is slanted downwardly toward a center of said housing for facilitating drainage.

8. The storm drain filter of claim 6, wherein said cartridge is detachable from said bottom plate of said housing for convenient replacement.

9. The storm drain filter of claim 6, wherein said top cover of said cartridge is removable from said inner screen and said outer screen for replacing said filter media.

10. The storm drain filter of claim 6, further including a flange around said surrounding wall adapted to engage a shoulder of said storm drain.

11. The storm drain filter of claim 6, further including a generally vertical tubular intermediate screen between said inner screen and said outer screen, wherein said outer screen and said intermediate screen are adapted to hold a first filter medium there between for filtering a first contaminant, and said inner screen and said intermediate screen are adapted to hold a second filter medium there between for filtering a second contaminant.

12. The storm drain filter of claim 6, further including a handle attached across said central overflow opening of said filter cartridge.

13. A storm drain filter, comprising:
a tubular housing with a solid surrounding wall and a solid annular bottom plate attached inside said surrounding wall;
wherein said bottom plate is slanted downwardly toward a center of said housing for facilitating drainage;
a flange around said surrounding wall adapted to engage a shoulder of said storm drain;
a tubular filter cartridge positioned within said surrounding wall and detachably supported on said bottom plate of said housing for convenient replacement, said cartridge comprising:
a solid annular top cover positioned above a solid annular bottom closure;
a generally vertical tubular outer screen extending between said top cover and said bottom closure;
a generally vertical tubular inner screen positioned within said outer screen and extending between said top cover and said bottom closure;
wherein said outer screen and said inner screen are adapted to receive one or more filter media there between; and
a central overflow opening arranged inside said inner screen of said cartridge and aligned with a hole within said bottom plate of said housing;
an annular debris trough defined between said outer screen of said filter cartridge and said surrounding wall of said housing; and
a handle attached across said central overflow opening of said filter cartridge;
whereby said outer screen is adapted to block larger debris flowing into said filter;
said debris trough is adapted to collect said larger debris; and
said filter media is adapted to block smaller debris and contaminants; so that
when a lower part of said outer screen is obstructed by a rising level of said larger debris, an unobstructed upper part of said outer screen is adapted to continue to filter fluid; and
when said outer screen is clogged, said central overflow opening is adapted to continue to drain said fluid.

14. The storm drain filter of claim 13, wherein said top cover of said cartridge is removable from said inner screen and said outer screen for replacing said filter media.

15. The storm drain filter of claim 13, further including a vertical intermediate screen between said inner screen and said outer screen, wherein said outer screen and said intermediate screen are adapted to hold a first filter medium there between for filtering a first contaminant, and said inner screen and said intermediate screen are adapted to hold a second filter medium there between for filtering a second contaminant.

* * * * *